United States Patent [19]

Cochran et al.

[11] 4,332,134

[45] Jun. 1, 1982

[54] HYDROSTATIC TRANSMISSION BLEED-OFF VALVE

[75] Inventors: Gary L. Cochran; Donald J. Parquet, both of Burlington, Iowa

[73] Assignee: J. I. Case Company, Racine, Wis.

[21] Appl. No.: 99,316

[22] Filed: Dec. 3, 1979

[51] Int. Cl.³ .............................................. F16K 31/12
[52] U.S. Cl. ...................................... 60/464; 60/488; 137/115
[58] Field of Search ................... 60/464, 488; 137/115

[56] References Cited

U.S. PATENT DOCUMENTS

| 3,230,699 | 1/1966 | Hann et al. | 60/464 X |
| 3,583,157 | 6/1971 | Adams et al. | 60/488 X |
| 3,866,421 | 2/1975 | Kersten et al. | 60/464 X |
| 4,189,921 | 2/1980 | Knapp | 60/488 |
| 4,209,988 | 7/1980 | Langworthy et al. | 60/464 |

*Primary Examiner*—William R. Cline
*Attorney, Agent, or Firm*—Dressler, Goldsmith, Shore, Sutker & Milnamow, Ltd.

[57] ABSTRACT

A valve to provide a controlled loss of hydraulic fluid from a closed loop hydrostatic transmission. A method of converting a bleed-off valve from one sensitive only to loop pressure to one sensitive to both loop pressure and charging line pressure. A pressure sensitive surface in flow communication with charging line pressure is used to position the valve to shut off flow in the event that charging line pressure is lost. In the event that charging line pressure and loop pressure are normal the valve provides a controlled bleed of hydraulic fluid. Finally, in the event that loop pressure becomes unacceptably high, flow is shut off.

12 Claims, 5 Drawing Figures

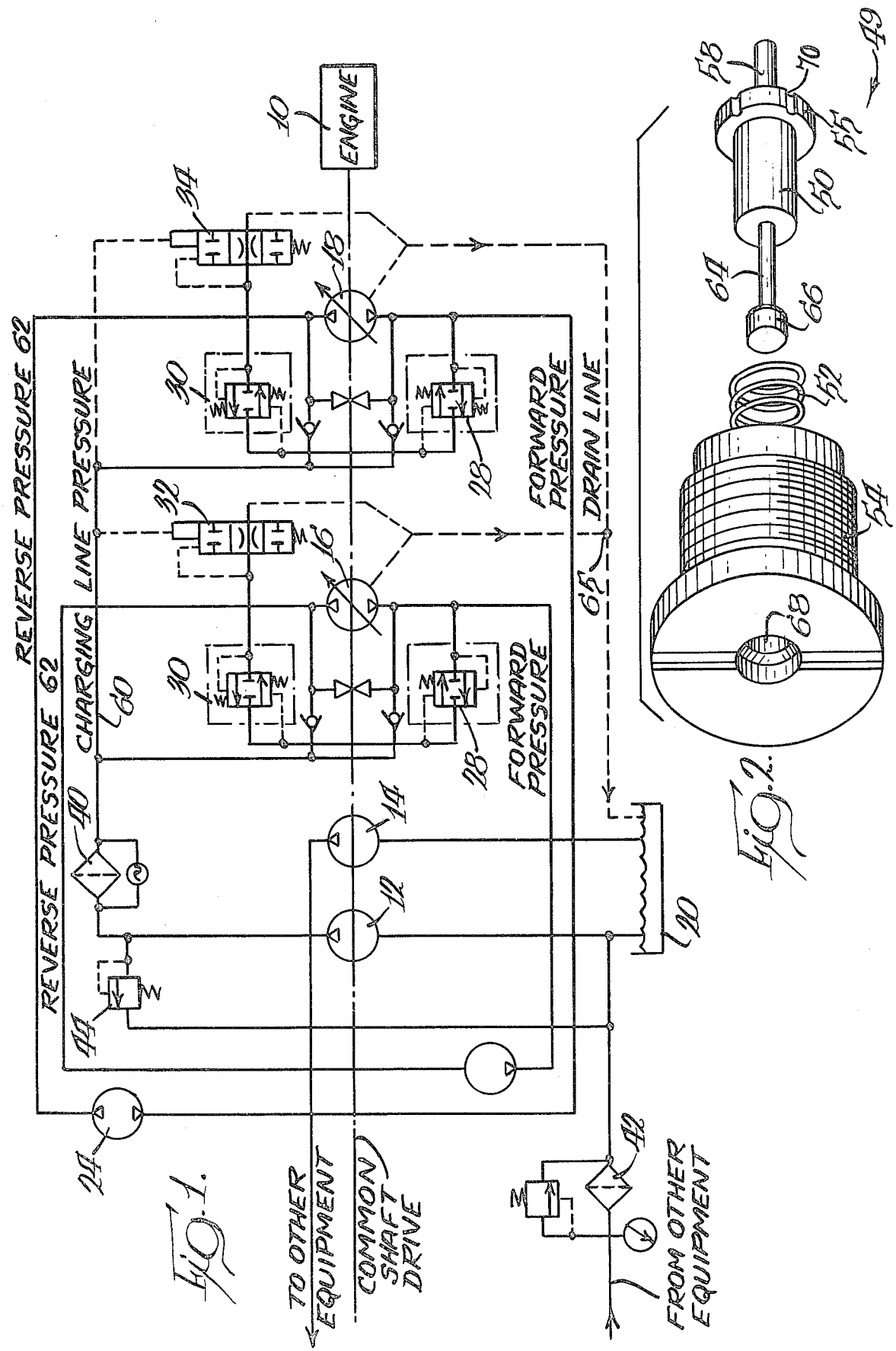

HYDROSTATIC TRANSMISSION BLEED-OFF VALVE

DESCRIPTION

Field of Invention

A bleed-off valve for a closed loop hydrostatic power transmission. A method of converting a bleed-off valve sensitive to loop pressure into one sensitive to loop charging system pressure and loop pressure.

Background of the Invention

Hydraulic systems operate most efficiently when the fluid temperature is held within a specified range. All hydraulic fluids are designed to provide minimal flow resistance with suitable sealing properties when the temperature is maintained within the proper range. Operating at a temperature below that of the recommended range results in sluggish movement of the fluid and other restrictions in the lines components. Temperatures higher than the desired level reduce the lubricating characteristics of the fluid and also can cause breakdown of the fluid into sludge and other contaminants. Heat will also cause sealing materials to become brittle and close-fitting precision parts of valves and other components to seize. In addition high temperatures lower the viscosity of the fluid which, in turn, reduces the efficiency of the hydraulic fluid system pumps.

In addition fluid friction, resulting from fluid flowing in components and lines, creates heat. In most systems, particularly those systems not in continuous operation, temperature control is not a problem. Most of the heat is dissipated as the fluid circulates through the hydraulic reservoir. In some systems, however, it is necessary to control the fluid temperature. A hydrostatic transmission is one such system.

The hydrostatic transmission system that is often found in machinery used in material handling applications, employs a hydraulic pump and a hydraulic motor. Specifically, a variable displacement pump and a variable displacement (or fixed displacement) motor are joined together in a closed loop. The displacement of a tilting plate is used to control the direction of flow coming from the positive displacement cylinders. When the tilting plate is at right angles to the shaft and the pump is rotating, the pistons will not reciprocate; therefore, no pumping action takes place. The displacement of this type of pump is varied by changing the angle of the tilt plate. Some pumps employ a bypass system to provide a supply of self-lubrication. Others rely on "leakage" between the hydrostatic rubbing parts. This is particularly important when the pump is in a non-flow condition. Similarly, if the transmission is operated at maximum flow or pressure for any length of time, not only the pump but also the entire hydrostatic transmission loop gets hot.

It is well known that in order to keep hydrostatic power transmission loop lines cool a "controlled bleed" can be used. Specifically, fluid is discharged at a low rate to a tank or other low pressure drain; simultaneously, the lost oil is replaced by cooler oil supplied by a pump. This make-up oil is often called "charging oil", and the associated hydraulic system is called the loop charging system.

The problem that can exist with this method of cooling is that the bleed off is operative even when not desired. That is, it is operative and effective in bleeding off a supply of hydraulic fluid even when charging pressure is lost on the loop charging line. When charging pressure becomes sufficiently low the hydraulic motors cavitate or "run free." This is an undesirable condition that can be prevented by the subject matter of this disclosure.

SUMMARY OF THE INVENTION

In accordance with the present invention a bleed-off valve is installed in a closed loop hydraulic power transmission system to keep the loop lines cool especially when the system is operated at full capacity for a prolonged period of time. In the event that charging system pressure is lost when the closed loop hydraulic system is in need of replenishment fluid, the bleed-off valve will shut off flow precluding any further loss of hydraulic fluid through it. If hydraulic system pressure is restored the valve will continue to operate as before. If a hydraulic power transmission system is used employing only one bleed-off valve, that valve is preferably connected to the low pressure or suction side of the closed loop corresponding to forward motion. When the tilting plate is reversed, making the latter side a high pressure or discharge side, the bleed-off valve functions to shut off flow. The flow is shut off because the continuous discharge of high pressure oil to the drain system wastes pump power.

More specifically, the poppet portion of a hydraulic system bleed-off valve is extended into the drain hole or low pressure side of the valve and an enlarged land is added to form a spool valve element for the purpose of shutting off flow through the bleed valve when charging system pressure is lost or low. In addition, the basic bleed-off valve is joined to a pressure sensing piston. This piston is in flow communication with loop charging line pressure. This makes the bleed-off valve sensitive to that pressure. The piston cooperates with the poppet of the bleed-off valve to establish a metered flow of fluid during normal conditions. Should charging system pressure be lost, the bleed-off valve goes shut. Finally, in the event that system pressure becomes substantially greater than normal, the bleed valve functions to shut off flow.

BRIEF DESCRIPTION OF THE DRAWINGS

FIG. 1 is a schematic representation of a hydraulic system employing bleed-off valves of the type defined by the present invention;

FIG. 2 is an exploded view of the major components of a bleed-off valve of the subject invention;

DETAILED DESCRIPTION OF THE INVENTION

Figure 3:
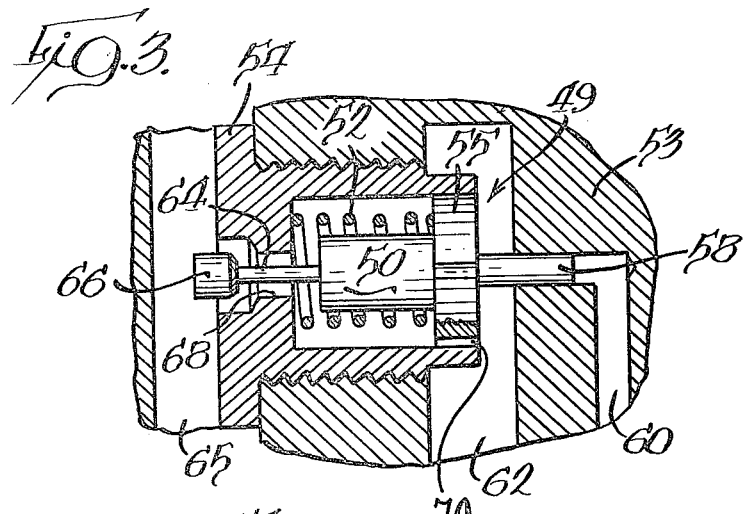
FIG. 3 is a schematic representation of the bleed-off valve under normal operation.

While this invention is susceptible of embodiment in many different forms, there is shown in these drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

FIG. 1 is a schematic drawing of a typical hydraulic system used in a small excavator or Uniloader. Such a system employs an internal combustion engine 10 to drive a charging pump 12 (usually a gear pump), an equipment pump 14 (usually a gear pump), and two variable displacement pumps 16 and 18 for moving the wheels of the vehicle. Hydraulic oil is stored in a common reservoir 20. Oil is drawn from the reservoir 20 by each of the wheel drive pumps 16 and 18. Similarly hydraulic fluid is drawn from the reservoir 20 by the equipment pump 14 and the charging pump 12. The charging pump 12 and equipment pump 14 define an open loop hydraulic system. The two pumps 16 and 18 supplying hydraulic fluid to the wheel motors 24 (right hand motor) and 26 (left hand motor) form a closed loop hydraulic transmission system. Relief valves 28 and 30 for each wheel pump limit the maximum safe pressure of the system in the forward and reverse directions respectively.

Bleed-off valves 32 and 34 are used to provide a controlled bleed of hydraulic fluid from the closed hydraulic loops to a low pressure drain line 65. The four wheels are turned by two hydrostatic motors 24 and 26. One motor 24 controls the wheels on the right-hand side and another motor 26 controls the wheels on the left-hand side. Filters 40 and 42, a charging line relief valve 44 and other miscellaneous components and valves complete the system.

More specifically, FIG. 1 illustrates a schematic drawing of a typical hydraulic system employing bleed-off valves 32 and 34 in the "reverse pressure loops" 62. In such an application bleed-off occurs when the vehicle is going forward only (e.g., low pressure in the reverse direction lines). Ordinarily, the pressure in the unloaded side of the closed loop hydrostatic transmission system will be approximately the same as the pressure in the charging line.

Throughout this discussion the pressure relationships among the various components of the hydrostatic transmission system must be kept in mind. Specifically, system pressure is at its highest downstream of the hydraulic fluid pump in its discharge line. The low pressure side of the system is at the inlet of the pump. Charging fluid is kept at a pressure lower than the high pressure side of the loop but higher than the low pressure side of the loop. Consequently, charging fluid or make up hydraulic oil is added to the low pressure side of the loop. The bleed-off valve discharges fluid from the low pressure loop. Therefore, when referring to "normal operating pressure" or "operating pressure" there is an inherent ambiguity since the tilt plate can be shifted to pressurize what was formerly the low pressure side and change the high pressure side to the low pressure side. The context in which the pressure relationships are discussed and the initial conditions existing upon which discussion is based should be kept in mind to avoid this inherent ambiguity in the nomenclature associated with hydrostatic transmission systems.

Bleed-off valves are sometimes used on both forward and reverse pressure loops. In such an application there would be four valves rather than the two shown. One disadvantage of such a system is the cost of requiring twice as many valves.

Since the problem of cooling hydrostatic transmission fluid is greatest when the pump is operating at high speed and since the vehicle is most likely to be operated in the ahead direction for a prolonged length of time, bleed-off valves may be effectively installed on the lines from the hydraulic pumps going to the hydraulic motors providing motion in the reverse direction (e.g. the low pressure side of the loop for forward motion).

While the bleed off valve may be installed at any convenient location in the hydrostatic transmission system, it is typically installed in the hydraulic pump casing 53. The preferred location (See FIGS. 3, 4, and 5) has flow ports joined to the charging line 60, the loop 62, and the low pressure drain line 65. The bleed off valve 49 controls flow from the loop 62 to the drain line 65.

The bleed-off valve 49 is a combination poppet valve (e.g. a valve whose elements move at right angles to the plane of the seat) and a sliding spool valve (e.g., a valve whose sealing is produced by a very closely machined fit between the spool and the valve body or sleeve). FIG. 2 illustrates the major components of the valve 49: a poppet 50; a poppet setting spring 52; and a combination housing and removable seat 54. The poppet 50 controls flow through a cylindrical port 68 defined by a valve seating surface in the housing 54 at the interface of the drain line 65 and loop 62. The skirt 55 or flared portion of the poppet 50 guides the axial motion of the poppet in the housing 54. The skirt also provides a surface area upon which the pressure difference between the loop 62 and the drain line acts to oppose the setting spring 52. The skirt may be fluted or notched 70 to facilitate the passage of oil. The poppet setting spring is positioned between the housing 54 and the skirt 55. When the poppet 50 is forced against the housing 54 (See FIG. 5) flow through the cylindrical port 68 is shut-off.

The poppet 50 includes a second pressure sensitive surface or piston 58. This piston 58 is free to move within a pressure sensing cylindrical port at the interface of the charging line 60 and the loop 62 in flow communication with the charging line 60.

The seating end of the valve 49 includes a land or spool 66 joined by a stem 64 to the poppet 50. The land 66 together with the cylinder 68 in which it slides forms a spool valve. The land 66 and the cylinder 68 cooperate together to shut-off flow from the bleed-off valve when the poppet is positioned to the right of its normal or equilibrium position (See FIG. 4).

The selection of the diameter of the piston 58 is governed by the size of the land 66. In particular, the diameter of the piston 58 must be less than the diameter of the land 66. This is necessary if there is to be a surface area upon which the pressure difference between the loop 62 and the drain line 65 can act to oppose the force of the setting spring 52. Drain line 65 pressure is always less than loop 62 pressure. The force applied by the piston 58 in opposition to the spring 52 is due to the difference in pressure between the charging line 60 and the loop 62 applied to the area of the piston 58 in flow communication with the charging line 60. Thus, the net force opposing spring pressure is just the difference in pressure between the loop 62 and the drain line 65 multiplied by the end area of the land 66 *plus* the difference in pressure between the charging line 60 and the loop 62 multiplied by the end area of the piston 58. This force must be balanced by the poppet setting spring 52 if there is to be equilibrium.

When the forces are balanced, a controlled bleed or metered flow is established between the land 66, the poppet 50 and the cylindrical bore 68 of the housing 54

(See FIG. 3). Thus, hydraulic fluid is discharged at a slow rate from the loop 62 only to be replaced by charging line fluid 60. This provides a "cooling effect" to the loop.

Figure 4:
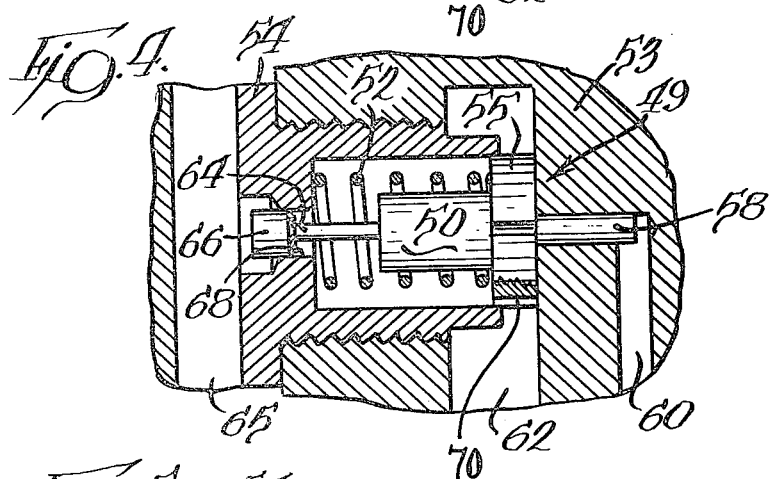
FIG. 4 is a schematic representation of the bleed-off valve during a condition of low charging line pressure.
Figure 5:
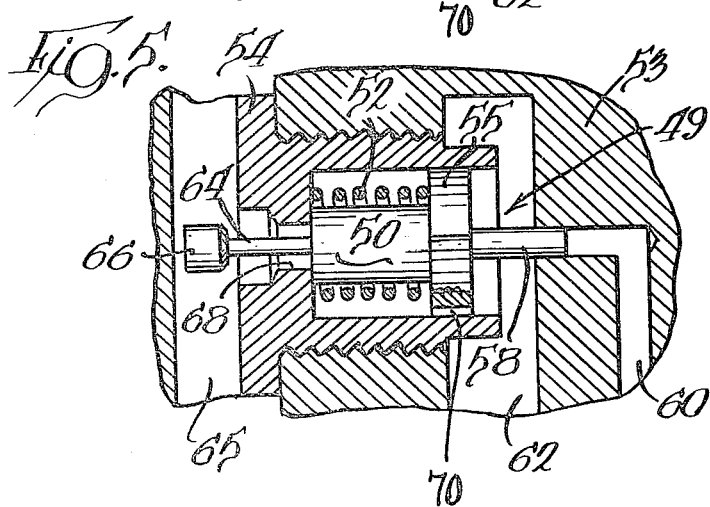
FIG. 5 is a schematic representation of the bleed-off valve during a condition of greater than normal loop pressure.

Should charging line pressure and loop pressure fall below the prescribed minimum operating pressure, the poppet setting spring 52 will reposition the valve to the right. This is because the force opposing the spring 52 is due to the difference between loop 62 pressure (now reduced) and drain line 65 pressure plus the difference between the charging line 60 pressure (also reduced) and loop 62 pressure. This reduced pressure-force is insufficient to oppose the spring force. This is illustrated in FIG. 4. The land 66, by fitting within the cylinder 68, forms a spool valve to shut off flow. This is the preferred condition. Further discharge of fluid from the closed loop is prevented so long as the charging system is unavailable to make up for fluid lost from the loop. Shutting off the bleed flow prevents the hydraulic motors cavitating or running free. This compound valving scheme will be recognized as an especially unique approach to bleed valve design and operation.

Finally, if loop 62 pressure is raised to a pressure corresponding to the high pressure side of the transmission system, the poppet 50 is driven to the left of its normal or equilibrium position. (See FIG. 5) Flow is shut-off when the poppet 50 seats against the housing 54. This would occur when excessive forward pressure is applied to the side of the loop having the bleed valve (i.e. reverse direction operation).

In summary, the valve performs conventionally in the event that charging line pressure and loop line pressure are normal *or* in the event that loop line pressure exceeds the prescribed operating range. The major change in performance being that the bleed-off valve now responds to shut-off flow whenever charging line pressure falls below the prescribed minimum operating pressure.

It will be appreciated that the improved hydrostatic transmission bleed-off valve provides an improved response relative to other prior art expedients. This is because the improved bleed-off valve is sensitive to loop charging line pressure. In other words, discharge of hydraulic fluid is not permitted from the unloaded loop unless there is a supply of pressurized, relatively cool, make-up oil or charging oil. This feature increases the reliability of the overall hydraulic circuit in which it is employed.

Of course, as was otherwise stated, the improved bleed-off valve may be used in other related hydrostatic transmission systems or indeed in any similar system calling for the use of a controlled discharge of fluid in anticipation of replenishment from another system. Neither is the invention limited to hydrostatic transmission systems employed in earth moving equipment since it is equally applicable to other devices employing such a system to transmit hydraulic power.

It is, of course, intended to cover by the appended claims all such modifications that fall within the scope of the invention.

What is claimed is as follows:

1. A bleed valve for a closed loop hydrostatic transmission system having a charging line, a low pressure loop line, a high pressure loop line, and a low pressure drain line, comprising:
    (a) a housing in flow communication with: said low pressure drain line; said low pressure loop line; and said charging line, said housing defining a seating surface at an interface between said low pressure drain line and said low pressure loop line, and a pressure sensing port at an interface between said charging line and said low pressure loop line; and
    (b) poppet means disposed within said housing, differentially responsive to the pressure in said low pressure loop line and the pressure in said charging line, for metering hydraulic fluid flow from said low pressure loop line to said low pressure drain line; and
    (c) means for balancing the pressure-forces applied to said poppet means, said balancing means and said poppet means cooperating together to shut off said metered flow of hydraulic fluid in response to the force of said balancing means exceeding the pressure forces applied to said poppet means by the pressure in said charging line and the pressure in said low pressure loop line.

2. A bleed valve for a closed loop hydrostatic transmission system having a charging line, a low pressure loop line, a high pressure loop line, and a low pressure drain line, comprising:
    (a) a housing in flow communication with: said low pressure drain line; said low pressure loop line; and said charging line, said housing defining a seating surface at an interface between said low pressure drain line and said low pressure loop line, and a pressure sensing port at an interface between said charging line and said low pressure loop line; and
    (b) poppet means disposed within said housing, differentially responsive to the pressure in said low pressure loop line and the pressure in said charging line, for metering hydraulic fluid flow from said low pressure loop line to said low pressure drain line; and
    (c) means for balancing the pressure-forces applied to said poppet means, said balancing means and said poppet means cooperating together to shut off said metered flow of hydraulic fluid in response to the force of said balancing means exceeding the pressure forces applied to said poppet means by the pressure in said charging line and the pressure in said low pressure loop line,
    wherein said poppet means includes a valve spool cooperating with said seating surface to bleed hydraulic fluid from said low pressure loop line to said low pressure drain line, said balancing means cooperating with said valve spool to shut off flow to said drain line in response to the force of said balancing means exceeding the pressure forces applied to said poppet means by the pressure in said charging line and the pressure in said low pressure loop line.

3. A bleed valve for a closed loop hydrostatic transmission system having a charging line, a high pressure loop line, a low pressure loop line, and a low pressure drain line, comprising:
    (a) a housing in flow communication with: said low pressure drain line; said low pressure loop line; and said charging line, said housing defining a seating surface at an interface between said low pressure drain line and said low pressure loop line, and a pressure sensing port at an interface between said charging line and said low pressure loop line;
    (b) poppet means disposed within said housing, differentially responsive to the pressure in said low pressure loop line and the pressure in said charging line, for metering hydraulic fluid flow from said low pressure loop line to said low pressure drain line; and (c) means for balancing the pressure-forces applied to said poppet means, said balancing means and said poppet means cooperating together to shut off said metered flow of hydraulic fluid in response to the force of said balancing means exceeding the pressure forces applied to said poppet means by the pressure in said charging line and the pressure in said low pressure loop line;

wherein said poppet means includes a poppet and poppet skirt means responsive to the pressure difference between said drain line and said low pressure loop line for biasing said poppet to bleed hydraulic fluid from said low pressure loop line to said drain line, said poppet skirt means cooperating with said poppet to shut off flow of said drain line in response to said low pressure loop line being pressurized to a pressure corresponding to said high pressure loop line, said low pressure loop line being pressurized to the pressure of said high pressure loop line in the event of said hydrostatic transmission system being shifted from a forward to a reverse direction.

4. A bleed valve for a closed loop hydrostatic transmission system having a charging line, a suction line associated with a low pressure side of said loop, a discharge line associated with a high pressure side of said loop, a hydraulic pump and a low pressure drain line, said hydraulic pump having a tilt plate, shifting of said tilt plate having the effect of reversing the pressures in said suction and discharge lines, comprising:

(a) a housing in flow communication with: said low pressure drain line; said suction line; and said charging line, said housing defining a seating surface at an interface between said low pressure drain line and said suction line, and a pressure sensing port at an interface between said charging line and said suction line; and (b) poppet means, differentially responsive to the pressure in said suction line and the pressure in said charging line and positioned within said housing for metering hydraulic fluid flow from said suction line to said drain line, said poppet means including a poppet and a land joined by a common stem, said seating surface cooperating with said poppet to define a poppet valve, said poppet valve repositioning to shut off metered flow of hydraulic fluid from said suction line to said drain line in response to an increase in pressure in said suction line, whereby said flow to said drain line is shut off in the event said tilt plate is shifted in position, said seating surface further cooperating with said land to define a spool valve, said spool valve repositioning to shut off metered flow of hydraulic fluid from said suction line to said drain line in response to a reduction in pressure in said charging line and said suction line.

5. A bleed-off valve for a hydrostatic transmission having a closed hydraulic operating loop including high and low pressure sides, a drain line to which said bleed valve responsively meters hydraulic fluid from one of the sides of said closed loop, and a charging line for replenishing fluid in said closed loop, comprising:

a housing disposed in fluid flow communication with said one side of said closed loop and said drain line having a passage communicating between said one side and said drain line, and poppet valve means disposed within said housing passage and including means responsive to the fluid pressure within said one side of said closed loop and means responsive to the fluid pressure in said charging line whereby metered flow of hydraulic fluid from said closed loop to said drain line is shut off when fluid pressure in said charging line is lower than a predetermined fluid pressure for said closed loop.

6. The bleed-off valve defined in claim 5, wherein said housing is a part of the casing of a variable displacement hydraulic pump forming part of said closed loop hydrostatic transmission.

7. The bleed-off valve recited in claim 5, wherein said means responsive to fluid pressure in said charging line includes a pressure sensitive piston in communication with said charging line.

8. The bleed-off valve of claim 7, wherein said poppet valve means include a poppet, and said housing defines a seating surface which cooperates with said poppet to shut off metered flow from said closed loop to said drain line.

9. The bleed-off valve of claim 8, wherein said poppet valve means further includes a land spaced from said poppet which cooperates with said seating surface to shut off metered flow from said closed loop to said drain line.

10. A bleed-off valve for a closed loop hydrostatic transmission including a low pressure line, a high pressure line, a low pressure drain line and a charging line, said bleed-off valve metering hydraulic fluid flow from said low pressure line to said drain line, comprising:

a housing in fluid flow communication with said low pressure line and said drain line, valve means disposed within said housing for metering flow from said low pressure line to said drain line responsively to the differential fluid pressure of said low pressure line and said drain line, said valve means including piston means responsive to the fluid pressure in said low pressure line and said charging line, and spool means cooperative with said housing for metering fluid flow to said drain line, said piston means repositioning said spool means to shut off flow to said drain line in response to the lowering of pressure in said low pressure line and said charging line.

11. The bleed-off valve of claim 10, wherein said piston means includes a piston in fluid flow communication with said charging line and responsive to fluid pressure therein.

12. A bleed valve for a closed loop hydrostatic transmission including a low pressure line, a high pressure line, a low pressure drain line, and a charging line, said bleed valve metering hydraulic fluid flow from said low pressure line to said drain line, comprising:

a housing in fluid flow communication with said drain line and said low pressure line, and valve means disposed within said housing for metering flow from said low pressure line to said drain line, said valve means including a poppet adapted to seat against a seating surface defined by the housing for shutting off flow from said low pressure line to said drain line when the fluid pressure in said low pressure line is raised to a pressure corresponding to the fluid pressure of said high pressure line, said valve means further including piston means in fluid flow communication with said charging line responsive to the pressure therein, said valve means further including spool means spaced from said poppet and adapted to cooperate with said housing for shutting off flow from said low pressure line to said drain line when said piston means repositions said valve means responsively to a decrease in fluid pressure in said charging line below a predetermined value, and spring means operatively disposed between said valve means and said housing for balancing forces exerted upon the valve means by fluid pressure in said charging line, said low pressure line, and said drain line.

* * * * *